Figure 1:
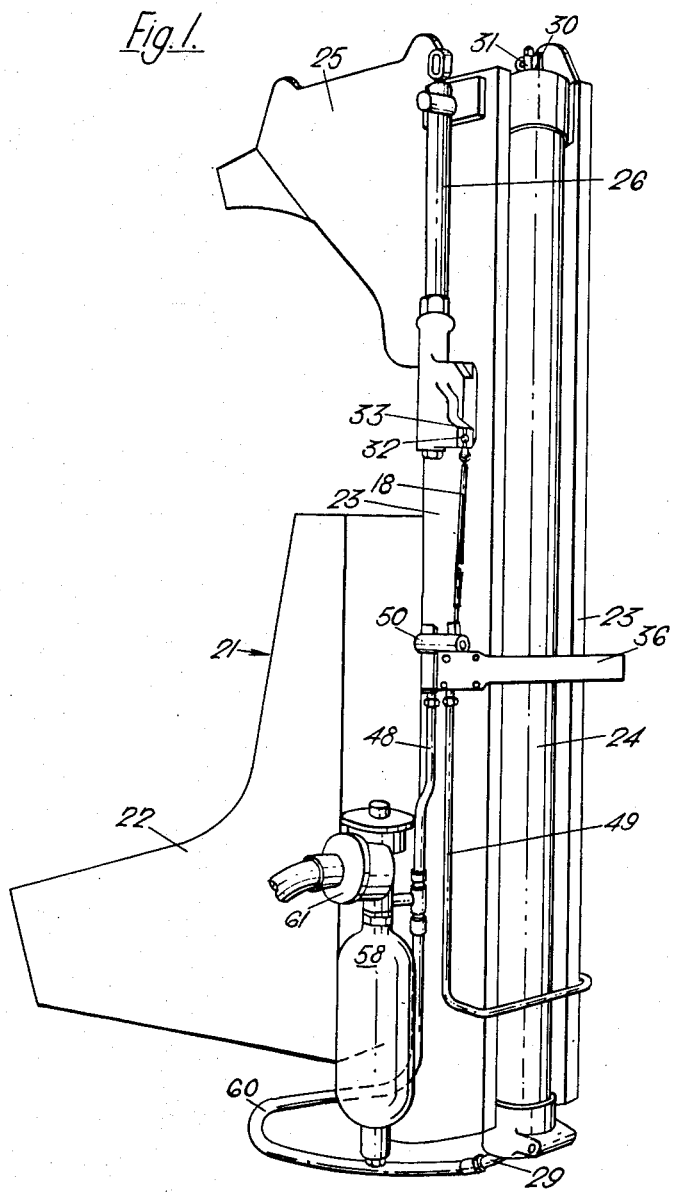

April 20, 1965   J. MARTIN   3,179,359
VEHICLE ESCAPE SYSTEMS
Filed Feb. 15, 1963   2 Sheets-Sheet 1

Inventor
James Martin
By

April 20, 1965     J. MARTIN     3,179,359
VEHICLE ESCAPE SYSTEMS

Filed Feb. 15, 1963     2 Sheets-Sheet 2

Inventor
JAMES MARTIN
By Kurt Kelman
agent

United States Patent Office
3,179,359
Patented Apr. 20, 1965

3,179,359
VEHICLE ESCAPE SYSTEMS
James Martin, Southlands Manor, Southlands Road,
Denham, near Uxbridge, Middlesex, England
Filed Feb. 15, 1963, Ser. No. 258,836
Claims priority, application Great Britain, May 18, 1962,
19,204/62; Dec. 5, 1962, 45,994
4 Claims. (Cl. 244—122)

This invention relates to vehicle escape systems and in particular to escape systems for aircraft and other analogous vehicles all, for the purposes of the present specification, being called "aircraft."

With the advance that has taken place in the development of aircraft escape systems including ejection seats, the likelihood of an airman having to enter the water while in his aircraft, for example in the event of an emergency whilst flying over the sea, has been reduced to almost negligible proportions. However, in the case of aircraft operating from naval aircraft carriers, there is an ever present danger of an airman and his aircraft entering the water as a result of the aircraft failing to be arrested by the arrestor devices on the carrier and falling over the side of the carrier, or as the result of engine failure or like mishap during take-off.

It is well understood that in the escape of an airman from his aircraft by means of an ejection seat of the kind developed by Martin-Baker Aircraft Co., Ltd., the sequence of operations is generally initiated by the airman pulling down a blind over his face.

Movement of this blind may first actuate mechanism which releases and jettisons the aircraft canopy, further movement of the blind then unlocking the aircraft ejection seat from the aircraft and thereafter initiating the firing of the ejection gun.

As the seat leaves the aircraft a drogue gun is fired to deploy one or more drogues which stabilise the flight of the seat and retard it, if necessary, to a velocity appropriate for deployment of the airman's personal parachute and separation of the airman from the seat.

The drogue or drogues are attached to the seat by a shackle (opened by a sensing device, at an appropriate instant, which also releases the airman's harness) and to the airman's personal parachute ripping and deploying mechanism by a drawline which extends through a line-cutting device which is used to sever the drawline when the airman wishes to escape from the aircraft in an emergency otherwise than by use of the ejection seat. During the normal ejection sequence, the release of the drogue drawline from the shackle enables the line to be pulled clear of the line-cutting device.

From the foregoing, it will be understood that in escape by ejection in an air environment a number of operations occur, some of which could be detrimental to the survival of the airman if the sequence were initiated with the aircraft submerged; moreover, it is desirable that certain other operations should occur in the case of an escape from a submerged aircraft to facilitate survival of the airman whilst and after he has been carried out of the aircraft in the ejection seat.

In my co-pending application Serial No. 258,830 of even date, I have disclosed an escape system that meets the requirements for escape from a submerged vehicle, particularly an aircraft, as well as meeting the requirement for escape in air environment without compromise to the performance attained with a fully developed system for achieving escape in such environment.

More specifically, my aforesaid application discloses an aircraft escape system based on an ejection seat, for instance the well-known Martin-Baker aircraft ejection seat, which, without compromise to the performance attainable with such a seat in an air-environment ejection, provides for the performance of a sequence of operations specifically designed to meet the requirements for escape from a submerged aircraft when such escape has to be effected.

Thus, in my said application I have disclosed an aircraft escape system including an ejection seat and means operable in ejection of the seat from the aircraft when submerged for performing any one or any combination of the following functions—canopy unlocking and/or jettison, severing a drawline securing the airman's personal parachute mechanism to a drogue via a shackle on the ejection seat at a point between the airman's personal parachute mechanism and said shackle, inflating a seat squab, inflating a back rest, inflating a life jacket worn by an airman, and disabling a drogue gun (if provided) on the seat.

In preferred embodiments of the aircraft escape system disclosed in my aforesaid application, the means operable in ejection of the seat from the aircraft when submerged include a container for pressure fluid and at least one pressure fluid-actuated device for performing the specified function or functions.

The present invention is particularly concerned with an escape system as disclosed in my aforesaid application Serial No. 258,830, and has for its object the provision of a device for effecting disablement of the drogue gun of an ejection seat constituting part of such an aircraft escape system.

The drogue gun of an aircraft ejection seat is now usually fired or prepared for firing during the course of ejection by means of a static connection, e.g., a line or link, anchored at one end to the aircraft or to a part of the ejection seat assembly that is fixed to the aircraft, the other end of said static connection being fixed to the operating mechanism of the drogue gun so that relative movement between the seat and the aircraft during the initial part of an ejection sequence serves to cause actuation of the drogue gun operating mechanism. In typical aircraft ejection seats as manufactured by Martin-Baker Aircraft Co., Ltd., the drogue gun is fired by means of a static link having one end anchored to that part of the ejection gun that is secured to the aircraft and its other end connected to a sear for the firing pin of the drogue gun, the arrangement being such that, as the seat leaves the aircraft during ejection, the sear is withdrawn as a result of its attachment to the static link to cock and then release the drogue gun firing pin thereby to initiate firing of the drogue gun.

Thus, more specifically, an object of the present invention is to provide a device operable when required, e.g. immediately prior to ejection of the seat from a submerged aircraft, for disconnecting the static line or link from the drogue gun operating mechanism, or, as is preferred, from the aircraft or part fixed or adapted to be fixed thereto.

Drogue gun-disabling means in accordance with the present invention comprise a static connection anchorage including a pin for securing a static connection to such anchorage and a piston and cylinder assembly operable by fluid pressure to displace said pin to a release position for releasing such static connection from said anchorage.

The piston of such piston and cylinder assembly may be directly connected to said pin but, in preferred arrangements, said pin is disposed transversely of the path of movement of the piston of said assembly and co-operates with a ramp on said piston, so that the pin is displaced transversely of the direction of movement of the piston in response to movement of the latter.

The piston of the said assembly may, if desired, be adapted to perform additional functions upon movement in response to admission of pressure fluid to the cylinder of the assembly; for instance in certain embodiments of the invention the movement of the piston is adapted for effecting opening of a pressure fluid control valve in the pressure fluid supply to a pressure fluid-actuated device performing or controlling another function or group of functions of the overall escape system of which the drogue gun-disabling means is to form part.

Where the piston movement is to perform or control some other function such as indicated above and the correct performance of such other function requires the piston to remain in the end position to which it has been moved by the admission of pressure fluid to the cylinder of the piston and cylinder assembly, the arrangement may include means for retaining the piston in such end position. In preferred embodiments of the drogue gun-disabling means of the invention, such retention of the piston is conveniently effected by means of a spring-loaded detent that engages a recess in the piston when this has moved to the end position in which it is to be retained. Such detent may, for instance, be coupled to said pin that, in such preferred embodiments, extends transversely of the direction of movement of the piston, the detent co-operating with the ramp on the piston whereby the movement of the piston is effective to displace the detent against its spring loading, the ramp terminating in a recess to be engaged by the detent when the piston has moved to the required end position.

In order that the invention may be more readily understood, a drogue gun-disabling device in accordance with the present invention and intended for incorporation in an aircraft escape system as disclosed in my aforesaid application Serial No. 258,830 will now be described by way of example and with reference to the accompanying drawing. The illustrated escape system shows only those parts of the system fully described and illustrated in my application No. 258,830, which are pertinent to this invention and comprises an aircraft ejection seat generally indicated at 21 and including a seat pan 22 mounted on guide rails 23. The guide rails constitute a guide structure adapted to be fixed to the aircraft and embrace an ejection gun 24. The seat also comprises a head box 25 forming a stowage for a drogue system (not shown) which is deployed, on ejection of the seat in an air environment, by means of a droque gun 26. The ejection gun incorporates, in its base, a pressure fluid inlet 29 while the upper end of the ejection gun is fitted with a primary cartridge and firing mechanism including a sear 30 that is adapted to be withdrawn from a firing pin 31.

The drogue gun 26 has a firing means including firing pin 32 restrained by a sear 33 which is coupled by a static link 18 to an anchorage generally indicated at 50 and supported by a bracket 36 fixed to the aircraft so that, upon commencement of seat ejection, the sear 33 is withdrawn from the firing pin 32 to fire the drogue gun and cause deployment of the drogue system.

All of this structure is illustrated and more fully explained in my copending application Serial No. 258,830 which also shows and describes the primary pressure vessel 58 of the escape system. This is mounted on the aircraft and stores a suitable volume of a pressure fluid medium, such as compressed air at high pressure. Vessel 58 is connected to a conduit 60 leading to the inlet 29 of the ejection gun 24, operating the same in a manner fully described in the aforesaid application and forming no part of the present invention.

Figure 2:
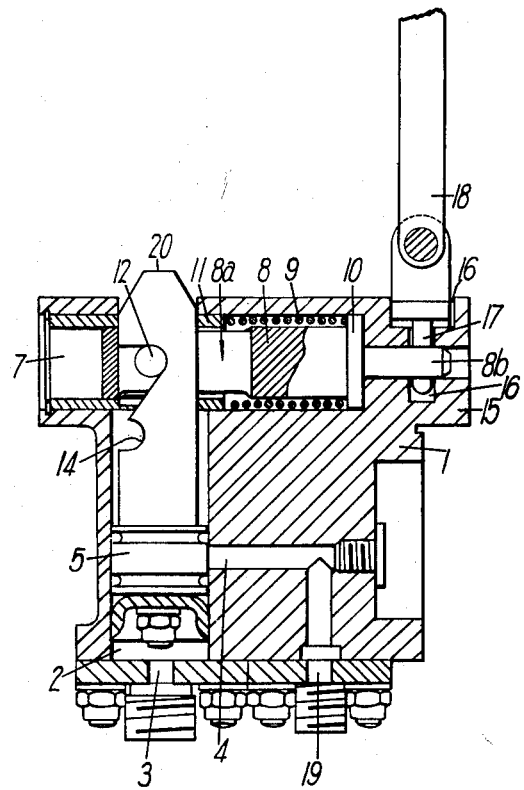

The compressed air inlet 4 in body 1 of the drogue gun disabling device of this invention is also connected to the vessel 58, as shown in FIG. 1, and the operation and structure of this device will now be explained in connection with FIG. 2.

The illustrated drogue gun-disabling device comprises a body 1 adapted to be mounted on an aircraft structure (not shown) adjacent to an ejection seat or upon a part of the seat that is permanently fixed to the aircraft.

The body 1 of the drogue gun-disabling device constitutes a cylinder 2 open at one end and having its other, closed, end provided with an inlet 3 for compressed air, the cylinder 2 having a lateral outlet port 4 that is normally obturated by a piston 5 but which is uncovered by the piston 5 when this has been displaced towards the open end of the cylinder 2 by the admission of compressed air to the cylinder through the inlet 3, the uncovering of outlet port 4 by such movement of the piston 5 placing the outlet port in communication with the inlet 3 via the closed end of the cylinder 2. The compressed air is admitted to inlet 3 through conduit 48 coming from vessel 58 and the outlet port 19 is connected to line 49. As more fully described in my application Serial No. 258,830, when the aircraft is submerged to a depth sufficient to cause opening of a pressure-sensitive valve 61 of the compressed air storage vessel 58, compressed air will be supplied to inlet port 3 to disable the drogue gun 26 while air flows from the vessel 58 to the ejection gun inlet 29 to initiate ejection of the seat without operation of the drogue gun. Immediately upon disablement of the drogue gun by operation of the device shown in FIG. 2, air flows through outlet 19 into line 49 connected to a device (not shown) for inflating the seat occupant's life jacket. The structure and operation of the drogue gun disabling device is as follows:

The body 1 has a transverse passage 7 in which a slotted plunger 8 is slidable, the piston 5 extending through the slot 8a of the plunger 8. The plunger 8 is urged in one direction (to the right as seen in the drawing) within said passage 7 by means of a spring 9 trapped between a flange 10 on the plunger and a guide bush 11 within the passage 7, and such spring 9 urges a peg 12 on the plunger 8 into engagement with the corresponding side of the piston 5, which side of the piston is formed with a ramp 13 so that when the piston 5 moves towards the open end of its cylinder 2 upon admission of compressed air to the closed end thereof, the peg 12 on the plunger 8 rides upon the ramp 13 to retract the plunger 8 against the effort of spring 9. In some embodiments, the ramp 13 terminates in a notch 14, as illustrated, whereby the peg 12 rides over the end of the ramp 13 into notch 14. In such embodiments, the peg 12 engages in notch 14 to prevent the piston 5 moving in the opposite direction, i.e. towards the closed end of the cylinder 2 when it has completed its travel towards the open end of the cylinder. In other embodiments notch 14 is omitted.

One end of the plunger 8 is formed as a pin 8b slidable in a tubular boss 15 having a lateral recess 16 into which an eye 17 at one end of a drogue gun firing link 18 may fit with pin 8b extending through eye 17. The arrangement is such that the pin 8b will fit through eye 17 and thereby connect the drogue gun link 18 to the tubular boss 15 when the piston 5 is fully retracted and obturates the outlet port 4 of the body 1 of the device, the ramp 13 on the piston 5 being so shaped as to displace the plunger 8, and thereby retract pin 8b, from the eye 17 of the drogue gun firing link 18 to release same from the tubular boss 15 in the course of movement of the piston to the position in which it uncovers the outlet port 4.

The outlet port 4 is connected to an outlet 19 so that when the piston 5 has performed its movement to uncover outlet port 4, compressed air may flow to the outlet 19 to perform some other function, that has to occur after drogue gun disablement.

It will be noted that the end 20 of piston 5 projects from the body 1 and moves outwardly thereof in displacing plunger 8 as above described. Such movement of the exposed end 20 of the piston may be utilized, in an escape system incorporating the described device for initiating of the performance of further functions of the escape system. For example, such end 20 of the piston 5 may be adapted for co-operation with the valve of a compressed air container mounted on the ejection seat, outward movement of the piston end 20 being effective to open such valve to permit compressed air stored in said container to flow to, for instance, a drogue drawline-severing line-cutter.

The movement of the piston may also be adapted to effect disconnection of a static line or link which serves to effect firing of a rocket motor in a rocket-assisted ejection seat such as disclosed in my co-pending application Serial No. 150,670 filed November 7, 1961.

I claim:

1. An aircraft ejection seat comprising the combination of a guide structure adapted to be fixed to the aircraft; a seat structure mounted on the guide structure for movement therealong on ejection of the seat from the aircraft; a drogue gun mounted on the seat structure; a drogue gun firing means including a static link; and a releasable anchorage mounted fixedly in relation to the seat structure, said anchorage comprising a pin releasably engaged with the static link, a piston-and-cylinder assembly operatively connected to the pin, and a pressure fluid supply connected to the cylinder of the assembly, pressure fluid supplied to the cylinder moving the piston in the cylinder and displacing the pin from a link engaging to a link releasing position whereby the drogue gun firing means is disabled.

2. An aircraft ejection seat comprising the combination of a guide structure adapted to be fixed to the aircraft; a seat structure mounted on the guide structure for movement therealong on ejection of the seat from the aircraft; a drogue gun mounted on the seat structure; a drogue gun firing means including a static link; and a releasable anchorage mounted fixedly in relation to the seat structure, said anchorage comprising a pin releasably engaged with the static link, a piston-and-cylinder assembly, the cylinder of the assembly having two ends, a pressure fluid supply connected to one of the cylinder ends, a pressure fluid outlet intermediate the two cylinder ends, the piston of the assembly being moved in the cylinder from the one end towards the second end and past said outlet when pressure fluid is supplied to the one cylinder end whereby the one cylinder end and the outlet are in communication, a ramp on said piston, a plunger extending transversely of the piston and engaging said ramp for movement thereby in response to the piston movement, the releasable pin being carried by the plunger and displaced by the plunger movement from a link engaging to a link releasing position whereby the drogue gun firing means is disabled.

3. The aircraft ejection seat of claim 2, further comprising means for retaining said piston in an end position corresponding to the link releasing position of the pin.

4. The aircraft ejection seat of claim 3, wherein said piston retaining means comprises a spring-loaded detent engaging a recess in the piston.

References Cited by the Examiner

UNITED STATES PATENTS

| | | | |
|---|---|---|---|
| 2,003,205 | 5/35 | Kuhlemann | 24—73.05 |
| 2,527,020 | 10/50 | Martin | 244—122 |
| 2,622,298 | 12/52 | Macedo | 24—230.1 |
| 2,763,451 | 9/56 | Moran | 24—230.1 |
| 2,840,327 | 6/58 | Stanley | 24—230.1 |
| 3,075,208 | 1/63 | Mercer et al. | 24—230.1 |

FOREIGN PATENTS 580,385 7/59 Canada.

FERGUS S. MIDDLETON, *Primary Examiner.*

D. J. STOCKING, *Examiner.*